(12) United States Patent
Saber et al.

(10) Patent No.: US 12,328,724 B2
(45) Date of Patent: *Jun. 10, 2025

(54) METHOD AND DEVICE FOR PDCCH REPETITION IN MULTI-TRP SYSTEM

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,645

(22) Filed: Feb. 5, 2024

(65) Prior Publication Data

US 2024/0179708 A1 May 30, 2024

Related U.S. Application Data

(63) Continuation of application No. 17/470,562, filed on Sep. 9, 2021, now Pat. No. 11,895,648.

(60) Provisional application No. 63/225,882, filed on Jul. 26, 2021, provisional application No. 63/165,464, filed on Mar. 24, 2021, provisional application No. 63/156,511, filed on Mar. 4, 2021, provisional
(Continued)

(51) Int. Cl.
| | |
|---|---|
| *H04W 72/04* | (2023.01) |
| *H04L 1/1607* | (2023.01) |
| *H04L 5/00* | (2006.01) |
| *H04W 72/044* | (2023.01) |
| *H04W 72/1273* | (2023.01) |
| *H04W 72/23* | (2023.01) |

(52) U.S. Cl.
CPC ....... *H04W 72/1273* (2013.01); *H04L 1/1671* (2013.01); *H04L 5/0032* (2013.01); *H04L 5/0055* (2013.01); *H04L 5/0096* (2013.01); *H04W 72/044* (2013.01); *H04W 72/23* (2023.01)

(58) Field of Classification Search
CPC ....... H04L 1/08; H04L 1/1671; H04L 1/1822; H04L 1/1887; H04L 5/0032; H04L 5/0035; H04L 5/0055; H04L 5/0094; H04L 5/0096; H04W 72/044; H04W 72/1273; H04W 72/23
See application file for complete search history.

(56) References Cited

FOREIGN PATENT DOCUMENTS

| | | | | |
|---|---|---|---|---|
| CN | 107734606 B | * | 9/2023 | ............... H04L 1/00 |
| WO | WO-2015046830 A1 | * | 4/2015 | ............... H04B 7/26 |

(Continued)

*Primary Examiner* — Phuc H Tran
(74) *Attorney, Agent, or Firm* — The Farrell Law Firm, P.C.

(57) ABSTRACT

A method and a user equipment (UE) are provided for resource allocation. The UE receives repeated physical downlink control channels (PDCCHs) from a network. Each of the repeated PDCCHs includes downlink control information (DCI) that schedules reception of a same physical downlink shared channel (PDSCH) at the UE. The UE determines resources for at least one of transmission and reception at the UE, from a PDCCH having a latest start symbol or a latest ending symbol among the repeated PDCCHs. The repeated PDCCHs are received in accordance with the UE and the network communicating using a multi-transmission reception point (TRP) repetition scheme or a multi-TRP multi-chance scheme.

20 Claims, 8 Drawing Sheets

Related U.S. Application Data application No. 63/133,933, filed on Jan. 5, 2021, provisional application No. 63/108,698, filed on Nov. 2, 2020, provisional application No. 63/090,009, filed on Oct. 9, 2020.

(56) References Cited

FOREIGN PATENT DOCUMENTS

| WO | WO-2017157270 A1 | * | 9/2017 | ........... H04L 1/1692 |
|----|------------------|---|--------|-------------------------|
| WO | WO-2018028497 A1 | * | 2/2018 | ............... H04L 1/00 |
| WO | WO-2020006416 A1 | * | 1/2020 | ............... H04L 1/08 |

* cited by examiner

METHOD AND DEVICE FOR PDCCH REPETITION IN MULTI-TRP SYSTEM

PRIORITY

This application is a Continuation Application of U.S. application Ser. No. 17/470,562, filed in the U.S. Patent and Trademark Office on Sep. 9, 2021, which is based on and claims priority under 35 U.S.C. § 119(e) to U.S. Provisional Patent Applications filed on Oct. 9, 2020, Nov. 2, 2020, Jan. 5, 2021, Mar. 4, 2021, Mar. 24, 2021, and Jul. 26, 2021 in the United States Patent and Trademark Office and assigned Ser. Nos. 63/090,009, 63/108,698, 63/133,933, 63/156,511, 63/165,464, and 63/225,882, respectively, the contents of which are incorporated herein by reference.

FIELD

The present disclosure relates generally to multiple-input multiple-output (MIMO) transmission schemes, and more particularly, to transmission schemes for physical downlink control channel (PDCCH) transmissions from multiple transmission and reception points (TRPs) to schedule a same physical downlink shared channel (PDSCH).

BACKGROUND

MIMO transmission schemes have been widely used in digital communication to increase the capacity of wireless channels. The 3rd Generation Partnership Project (3GPP) mobile communication standard supports MIMO transmission schemes in which a PDSCH or physical uplink shared channel (PUSCH) is transmitted from different physical antennas or different antenna ports.

Different antenna ports of a MIMO transmission scheme may be within a single TRP, in which case the scheme is referred to as a single TRP transmission scheme. Different antenna ports of one or different channels may also be within multiple TRPs, which are typically non-co-located, in which case the scheme is referred to as a multi-TRP (M-TRP) scheme. An example of the M-TRP scheme includes a rank-2 PDSCH transmitted by two antenna ports, where a first antenna port is within a first TRP and a second antenna port is within a second TRP.

M-TRP transmissions can be categorized into single-downlink control information (DCI)-TRP and multi-DCI M-TRP. With single-DCI M-TRP, a single PDCCH is transmitted from one of the TRPs and schedules one or more PDSCHs. In one transmission scheme, different layers of a single PDSCH are transmitted from different TRPs. In other transmission schemes, multiple PDSCHs (multiplexed in a time domain or a frequency domain) with the same transport block (TB) are transmitted, where all layers of a single PDSCH are transmitted from a respective one of the TRPs. Different PDSCHs may be transmitted from different TRPs according to a pattern.

FIG. 1 is a diagram illustrating single-DCI M-TRP transmission scheme. A single DCI (PDCCH) 106 is transmitted to a user equipment (UE) 114 from a first TRP 102, and schedules a PDSCH 108 with two layers. A first layer 110 of the PDSCH is transmitted from a first antenna port within the first TRP 102, while a second layer 112 is transmitted from a second antenna port within a second TRP 104.

With multi-DCI M-TRP, each TRP transmits its own PDCCH, which schedules a PDSCH that is also transmitted from the ports within the same TRP.

FIG. 2 is a diagram illustrating multi-DCI M-TRP transmission. Each of the two TRPs, a first TRP 202 and a second TRP 204, transmits their own DCI (PDCCH), a first DCI 206 and a second DCI 208, respectively, to a UE 214. Each DCI schedules one PDSCH with two-layer transmission, a first PDSCH 210 and a second PDSCH 212. All of the layers of a given PDSCH are transmitted from the antenna ports within the same TRP.

Different multiplexing schemes can be applied for PDCCH transmission. The schemes include time division multiplexing (TDM), frequency division multiplexing (FDM), special division multiplexing (SDM), and single frequency network (SFN).

For a non-SFN M-TRP PDCCH transmission, the following schemes can be considered.

In a non-repetition scheme, one encoding/rate matching is for a PDCCH with two transmission configuration indicator (TCI) states. With this scheme, a single PDCCH candidate has two different TCI states. For example, specific control channel elements (CCEs)/resource element groups (REGs) of a candidate may be associated with a first TCI state and the remainder of the CCEs/REGs may be associated with a second TCI state.

In a repetition scheme, encoding/rate matching is based on one repetition, and the same coded bits are repeated for another repetition. Each repetition has the same number of CCEs and coded bits, and corresponds to the same DCI payload.

In a multi-chance scheme, separate DCIs schedule the same physical downlink shared channel (PDSCH)/physical uplink shared channel (PUSCH)/reference signal (RS)/transport block (TB)/etc., or result in the same outcome.

SUMMARY

According to one embodiment, a method is provided for resource allocation by a UE. The UE receives repeated PDCCHs from a network. Each of the repeated PDCCHs includes DCI that schedules reception of a same PDSCH at the UE. The UE determines resources for at least one of transmission and reception at the UE, from a PDCCH having a latest start symbol or a latest ending symbol among the repeated PDCCHs. The repeated PDCCHs are received in accordance with the UE and the network communicating using a multi-TRP repetition scheme or a multi-TRP multi-chance scheme.

According to one embodiment, a UE is provided that includes a processor and a non-transitory computer readable storage medium storing instructions. When executed, the instructions cause the processor to receive repeated PDCCHs from a network. Each of the repeated PDCCHs include DCI that schedules reception of a same PDSCH at the UE. When executed, the instructions further cause the processor to determine resources for at least one of transmission and reception at the UE, from a PDCCH having a latest start symbol or a latest ending symbol among the repeated PDCCHs. The repeated PDCCHs are received in accordance with the UE and the network communicating using a multi-TRP repetition scheme or a multi-TRP multi-chance scheme.

BRIEF DESCRIPTION OF THE DRAWINGS

The above and other aspects, features, and advantages of certain embodiments of the present disclosure will be more

DETAILED DESCRIPTION

Figure 1:
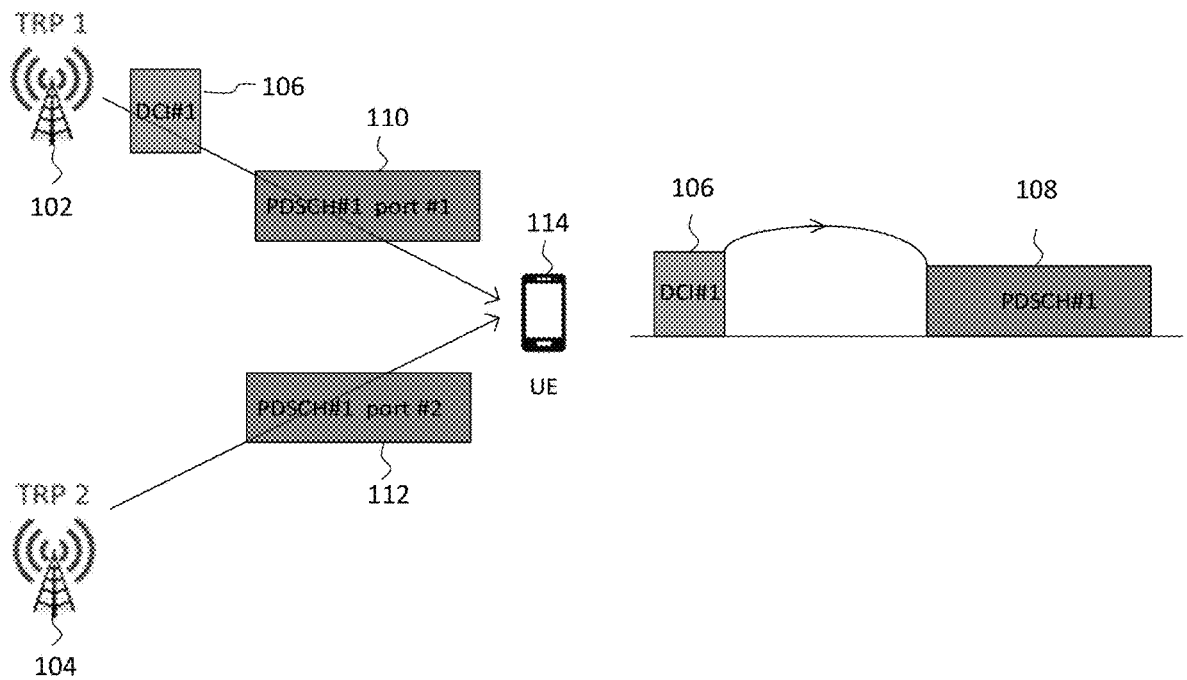
FIG. 1 is a diagram illustrating a single-DCI M-TRP transmission.
Figure 2:
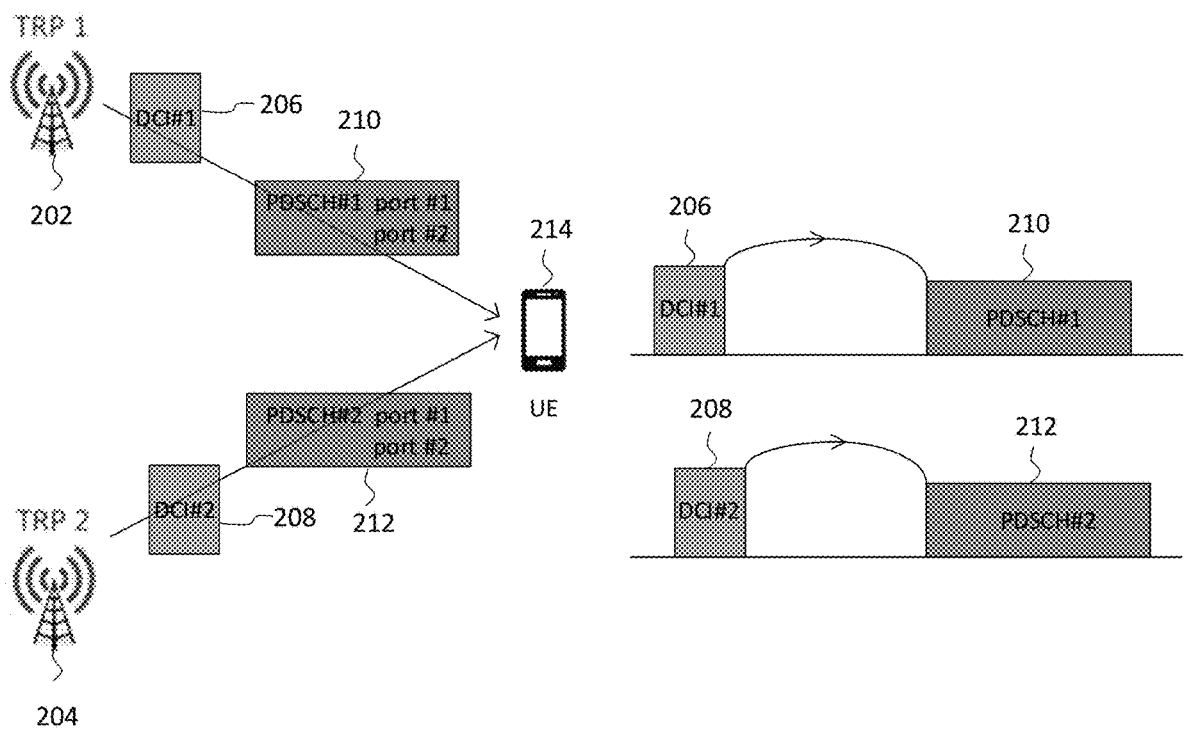
FIG. 2 is a diagram illustrating multi-DCI M-TRP transmission.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Embodiments of the present disclosure relate to multiple repeated PDCCHs scheduling the same PDSCH/PUSCH or providing control information to a group of UEs. A hybrid automatic repeat request-acknowledgment (HARQ-ACK) codebook is modified to support the PDCCH repetition. Moreover, embodiments of the present disclosure introduce: a UE procedure for determining the PUCCH resources for HARQ-ACK reporting; time domain resource allocation properties; default beam determination; and search space (SS) set/PDCCH candidate linkage properties.

Methods described herein enable proper functioning of M-TRP PDCCH repetition by introducing enhancements to the HARQ-ACK codebook, SS set definition, and default beam determination.

Many of the embodiments described in detail below apply to both repetition and multi-chance schemes, and they may be considered the same scheme where the core feature is two linked PDCCHs providing the same information about scheduling a PDSCH.

Figure 3:
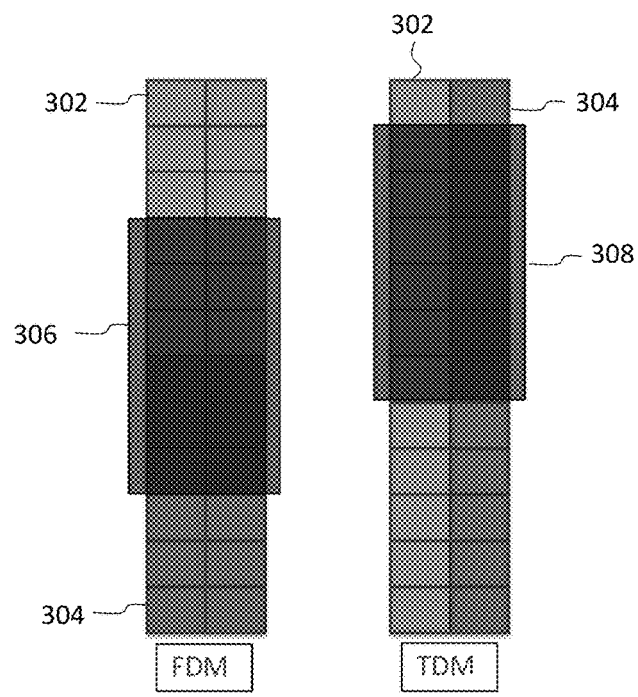
FIG. 3 a diagram illustrating PDCCHs according to the 1SS-1CORESET scheme, according to an embodiment.

In order to enable a PDCCH transmission with two different TCI states, one approach is to associate one control resource set (CORESET) with two different TCI states. This scheme is referred to as 1SS-1CORESET scheme. FIG. 3 is a diagram illustrating PDCCHs according to the 1SS-1CORESET scheme, according to an embodiment. Blocks 302 correspond to REGs/CCEs associated with a first TCI state, while blocks 304 correspond to REGs/CCEs associated with to a second TCI state. Accordingly, when using FDM, a first PDCCH (with DCI) 306 includes REGs/CCEs that are split evenly between the first and second TCI states. Similarly, when using TDM, a second PDCCH (with DCI) 308 also includes REGs/CCEs that are split evenly between the first and second TCI states.

Accordingly, the following schemes may be considered. In scheme A, a DCI or PDCCH candidate (in a given SS set) is associated with both TCI states of the CORESET. In scheme B, two sets of PDCCH candidates (in a given SS set) are associated with the two TCI states of the CORESET, respectively. In scheme C, two sets of PDCCH candidates are associated with two corresponding SS sets, where both SS sets are associated with the CORESET and each SS set is associated with only one TCI state of the CORESET.

For schemes B and C, the following cases may be considered for mapping between different PDCCH candidates with different TCI states. In case 1, Two or more PDCCH candidates are explicitly linked together (UE knows the linking before decoding). In case 2, Two or more PDCCH candidates are not explicitly linked together (UE does not know the linking before decoding).

Figure 4:
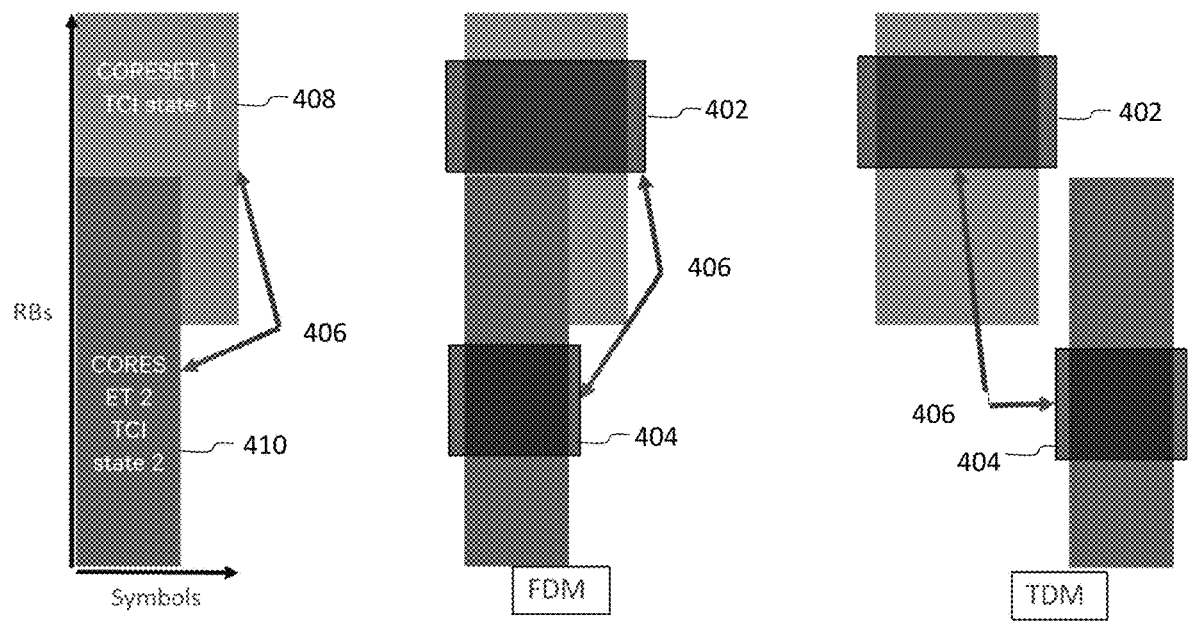
FIG. 4 is a diagram illustrating PDCCHs according to the 1SS-2CORESET scheme, according to an embodiment.

As an alternative to associating PDCCH candidates with two different TCI states, one SS set may be associated with two different CORESETs, where each CORESET is associated with a TCI state. This scheme is referred to as 1SS-2CORESET scheme. FIG. 4 is a diagram illustrating PDCCHs according to the 1SS-2CORESET scheme, according to an embodiment. A first PDCCH 402 and a second PDCCH 404 of a single SS set 406 are shown in a first CORESET 408 and a second CORESET 410, respectively, for both FDM and TDM.

Figure 5:
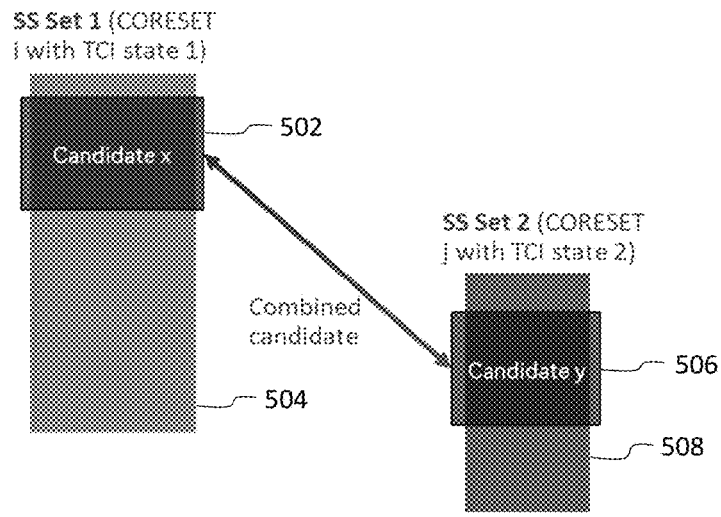
FIG. 5 is a diagram illustrating PDCCHs according to the 2SS-2CORESET scheme, according to an embodiment.

A different SS and CORESET multiplexing scheme is also possible to allow multiple TCI states for PDCCH candidates. With this scheme, referred to as 2SS-2CORESET scheme, two SS sets are associated with two CORESETs, where each CORESET is configured with a different TCI state. FIG. 5 is a diagram illustrating PDCCHs according to the 2SS-2CORESET scheme, according to an embodiment. Specifically, a first PDCCH 502 (candidate x) is from a first SS set and a first COERSET 504 having a first TCI state, while a second PDCCH (candidate y) 506 is from a second SS and a second CORESET 508 having a second TCI state.

While embodiments of the disclosure generally relate to the 1SS-1CORESET scheme, the described methods may be applied to any SS-CORESET multiplexing scheme. The following methods may also be applied to both repetition and multi-chance PDCCHs.

PDCCH Repetition and PDSCH Repetition

With any of the M-TRP PDCCH schemes (no repetition, repetition, and multi-chance), the PDSCH may be scheduled according to different repetition schemes introduced in 3GPP Rel-16. In particular, a UE may be configured by a higher layer parameter RepetitionScheme-r16 set to 'FDMSchemeA', 'FDMSchemeB' or 'TDMSchemeA', which relate to a TCI-state agnostic FDM scheme, an FDM scheme with two repetitions in a frequency domain, and a TDM scheme with repetitions in a time domain, respectively. In a different PDSCH transmission scheme based on slot-based repetition, a UE may be configured with a higher layer parameter RepetitionNumber-r16 with possible values of $N_{PDSCH,Rep}$=2, 3, 4, 5, 6, 7, 8, 16. The PDSCH is repeated in $N_{PDSCH,Rep}$ consecutive slots with an alternating TCI state with each repetition.

A TDM PDCCH or PDSCH transmission scheme is based on the assumption that the UE is not capable of simultaneously receiving two quasi co-location (QCL)-Type D TCI states (i.e., two different beams). Such a restriction must be applied to a PDCCH repetition scheme, if it is applied to the PDSCH scheme and vice versa. In general, it needs to be specified whether any combinations of (PDCCH transmission scheme, PDSCH transmission scheme) are supported.

When a PDCCH transmission scheme is employed with $M_{PDCCH,Rep}$ repetitions, it may be assumed that the scheduled slot-based PDSCH scheme is also repeated $M_{PDCCH,Rep}$ times (i.e., $N_{PDSCH,Rep}=M_{PDCCH,Rep}$). However, depending on the required reliability levels for PDCCH and PDSCH, a network may use a different number of repetitions for PDCCH and PDSCH.

Methods are described below that determine UE behavior for different configurations of the PDCCH and PDSCH repetition schemes.

In a first method with supported PDCCH and PDSCH transmission schemes, when a UE is configured with multi-TRP operation, the following schemes are not supported:

TDM-based PDCCH repetition and FDM-based PDSCH repetition: the UE is not expected to be configured with the PDSCH transmission scheme via RRC configuration of RepetitionScheme-r16 as 'FDMScheme A' or 'FDMSchemeB' and a TDM-based PDCCH repetition.

FDM-based PDCCH repetition and TDM-based PDSCH repetition: the UE is not expected to be configured with A) the PDSCH transmission scheme via RRC configuration of RepetitionScheme-r16 as 'TDMSchemeA' or a slot-based PDSCH repetition with alternating TCI states, and B) any FDM-based PDCCH repetition.

In the two schemes above, a TDM scheme refers to a scheme in which the UE does not receive PDCCH or PDSCH with two different TCI states on the same OFDM symbol. Additionally, an FDM scheme refers to a scheme in which the UE receives PDCCH or PDSCH with two different TCI states on different REs on the same OFDM symbol. This first method is only applicable when the two TCI states include two different QCL-typeD.

In a second method with supported PDCCH and PDSCH transmission schemes, when the UE is configured with multi-TRP operation:

If the UE is configured via RRC for a PDSCH transmission scheme via configuration of RepetitionScheme-r16 as 'FDMSchemeA' or 'FDMSchemeB', the UE is expected to be configured with the FDM-based PDCCH reception.

If the UE is configured via RRC for a PDSCH transmission scheme via configuration of RepetitionScheme-r16 as 'TDMSchemeA' or slot-based PDSCH repetitions with alternating TCI states, the UE is expected to be configured with the TDM-based PDCCH reception.

In the above-described alternatives, a TDM scheme refers to a scheme in which the UE does not receive PDCCH or PDSCH with two different TCI states on the same OFDM symbol. Additionally, an FDM scheme refers to a scheme in which the UE receives PDCCH or PDSCH with two different TCI states on different REs on the same OFDM symbol. This second method is only applicable when the two TCI states include two different QCL-typeD.

For a PDCCH transmission scheme with no repetition, the scheduled PDSCH may be with or without repetition. For a PDCCH transmission scheme with repetition or multi-chance, M repeated PDCCHs or multi-chance PDCCHs schedule a PDSCH with repetitions across N slots for M=N, M<N or M>N.

In general, the number of repetitions with different TCI states may be chosen by the network based on the link quality for each TRP, the blockage severity, the reliability requirements for PDCCH and PDSCH, etc. Since PDCCH and PDSCH may be transmitted in different serving cells, these factors may differ. Depending on these conditions, a gNodeB (gNB) may choose a different number of repetitions for PDCCH and PDSCH. In particular, if the PDCCH link is more reliable than the PDSCH, the gNB may transmit PDCCH with fewer repetitions than PDSCH (i.e., M<N). If the two links are similar, the gNB may transmit PDCCH and PDSCH with the same number of repetitions (i.e. M=N). If the PDCCH link is less reliable than the PDSCH link, the gNB may transmit PDCCH with a larger number of repetitions than PDSCH (i.e., M>N). These three options are set forth in the third method below.

In a third method with supported PDCCH and PDSCH repetition numbers, when a UE is configured with a multi-TRP operation, the gNB may configure UE via RRC with any of the following options:

Option a) M repeated PDCCH or M multi-chance PDCCH schedule a PDSCH with N slot-based repetitions where M<N.

Option b) M repeated PDCCH or M multi-chance PDCCH schedule a PDSCH with N slot-based repetitions where M=N.

Option c) M repeated PDCCH or M multi-chance PDCCH schedule a PDSCH with N slot-based repetitions where M>N.

Multi-Chance PDCCH and PDSCH Repetition: HARQ Process Number

In 3GPP Rel-15/16, a UE is not expected to receive a new PDSCH before transmission of the acknowledgement/negative acknowledgement (ACK/NACK) of an earlier PDSCH for the same HARQ-process.

Figure 6:
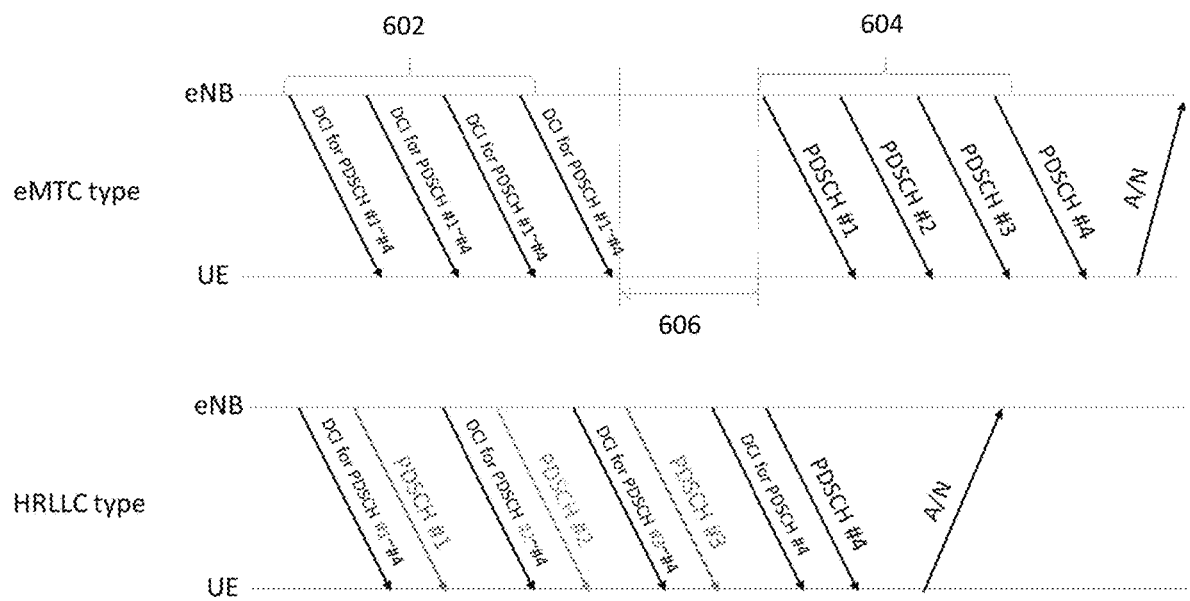
FIG. 6 is a diagram illustrating a multi-chance PDCCH operation, according to an embodiment.

FIG. 6 is a diagram illustrating a multi-chance PDCCH operation, according to an embodiment. In an enhanced machine type communication (eMTC), four multi-chance PDCCHs 602 with corresponding DCI schedule four PDSCHs 604, and all PDSCHs carry the same TB. All PDCCHs 602, each scheduling first through fourth PDSCHs, are transmitted from the eNodeB (eNB) to the UE, and the PDSCHs 604 are transmitted after a subframe offset 606.

For higher reliability and low latency communication (HRLLC), a PDSCH is transmitted after each PDCCH. A first PDCCH schedules first through fourth PDSCHs. A second PDCCH schedules second through fourth PDSCHs. A third PDCCH schedules third and fourth PDSCHs. A fourth PDCCH schedules the fourth PDSCH. An ACK/NACK corresponding to the four PDSCHs is transmitted over a PUCCH from the UE to the eNB.

When another PDSCH is interpreted as a PDSCH directly scheduled by a PDCCH, then the multi-chance scheme of FIG. 6 is not supported, since the ACK/NACK of all four PDSCHs are transmitted in the same PUCCH.

In a method with multi-chance PDCCH and PDSCH repetition, when a UE is configured with a multi-TRP operation and a multi-chance PDCCH transmission scheme:

The UE receives a second PDSCH for a given HARQ process before the end of the expected transmission of HARQ-ACK for a first PDSCH for the same HARQ process. In particular, the starting symbol of second PDSCH may start before the end of the ending symbol of PUCCH or PUSCH carrying the ACK/NACK of first PDSCH.

Multi-Chance PDCCH and PDSCH Repetition: Dynamic Indication of PDSCH

Referring back to FIG. 6, when the four PDCCHs are explicitly linked together, if the UE misses the first PDCCH and detects the second PDCCH, it will know that there will be three upcoming occasions of the PDSCH (i.e. PDSCH #2, #3 and #4), which are all scheduled by the second PDCCH and ignores an indication of four PDSCH repetitions by the TDRA row indicated by the DCI. However, if the PDCCHs are not linked together, the UE may incorrectly detect four PDSCH repetitions starting from the one indicated by the DCI. In this case, an unnecessary decoding is attempted. To avoid such decoding, one possibility is to indicate the number of PDSCH repetitions in the scheduling PDCCH, either explicitly or implicitly.

In a first method with explicit dynamic indication of the number of PDSCH repetitions in the multi-chance PDCCH, if the UE is configured to operate with multi-TCI PDCCH transmission by multi-TRP, and multi-chance PDCCH transmission scheme, a new DCI field is configured that indicates the number of repetitions of the scheduled PDSCH.

With respect to FIG. 6, the DCI field in the first PDCCH indicates a value of 4, the DCI field in the second PDCCH indicates a value of 3, the DCI field in the third PDCCH indicates a value of 2, and the DCI field in the fourth PDCCH indicates a value of 1.

An indication of the number of upcoming PDSCH occasions can also be done by joint encoding of ($K_0$, SLIV) and the number of repetitions as one row of the time domain resource allocation (TDRA) table.

In a second method with implicit dynamic indication of the number of PDSCH repetitions in the multi-chance PDCCH (joint encoding of a start and length indicator vector (SLIV) and number of repetitions), if the UE is configured to operate with multi-TCI PDCCH transmission by multi-TRP, and multi-chance PDCCH transmission scheme, the UE is configured with a TDRA table where each row includes a scheduling slot offset $K_0$, SLIV, and the number of repetitions (repetition_number).

With respect to FIG. 6, the DCI field in the first PDCCH indicates a TDRA row with a value repetition_number=4, the DCI field in the second PDCCH indicates a TDRA row with a value repetition_number=3, etc.

Reference Timing for A-CSI-RS Beam Switching

In 3GPP Rel-15/16, if a time gap from the end of the PDCCH and the start of an aperiodic-channel state information-reference signal (A-CSI-RS) is less than a threshold beamSwitchTiming, which the UE reports as a capability, default rules are provided for the UE to determine the beam for A-CSI-RS reception. If the gap is greater than the threshold, the TCI state indicated in the DCI is used for CSI-RS reception. Thus, the following is possible:

Gap>threshold when measured from the end of the first PDCCH

Gap<threshold when measured from the end of the last PDCCH

With multi-TRP PDCCH enhancement, in order for the UE and the network to have a common understanding of the gap, a reference time should be defined. Since the PDCCH processing time is normally measured from the end of the latest PDCCH, it is natural to define the gap from the end of the last symbol of the latest PDCCH to the start of the A-CSI-RS.

Figure 7:
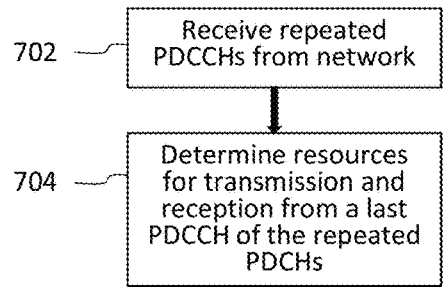
FIG. 7 is a flowchart illustrating a method for resource allocation by a UE, according to an embodiment.

FIG. 7 is a flowchart illustrating a method for resource allocation by a UE, according to an embodiment. At 702, repeated PDCCHs from a network are received at the UE. The term "repeated PDCCHs" can refer to PDCCHs including DCIs that schedule reception of a same PDSCH at the UE. At 704, the UE determines resources for at least one of transmission and reception at the UE, from a PDCCH having a latest start symbol or a latest ending symbol among the repeated PDCCHs. The repeated PDCCHs are received in accordance with the UE and the network communication using a multi-TRP repetition scheme or a multi-TRP multi-chance scheme.

Accordingly, a conservative approach is to choose the latest PDCCH as the reference PDCCH. Thus, in a first method with A-CSI-RS beam determination with repetition/multi-chance PDCCH (latest PDCCH as reference based on last symbol), the UE is configured to operate with multi-TRP PDCCH repetition or multi-TRP multi-chance, where the PDCCH triggers the A-CSI-RS reception.

Figure 8:
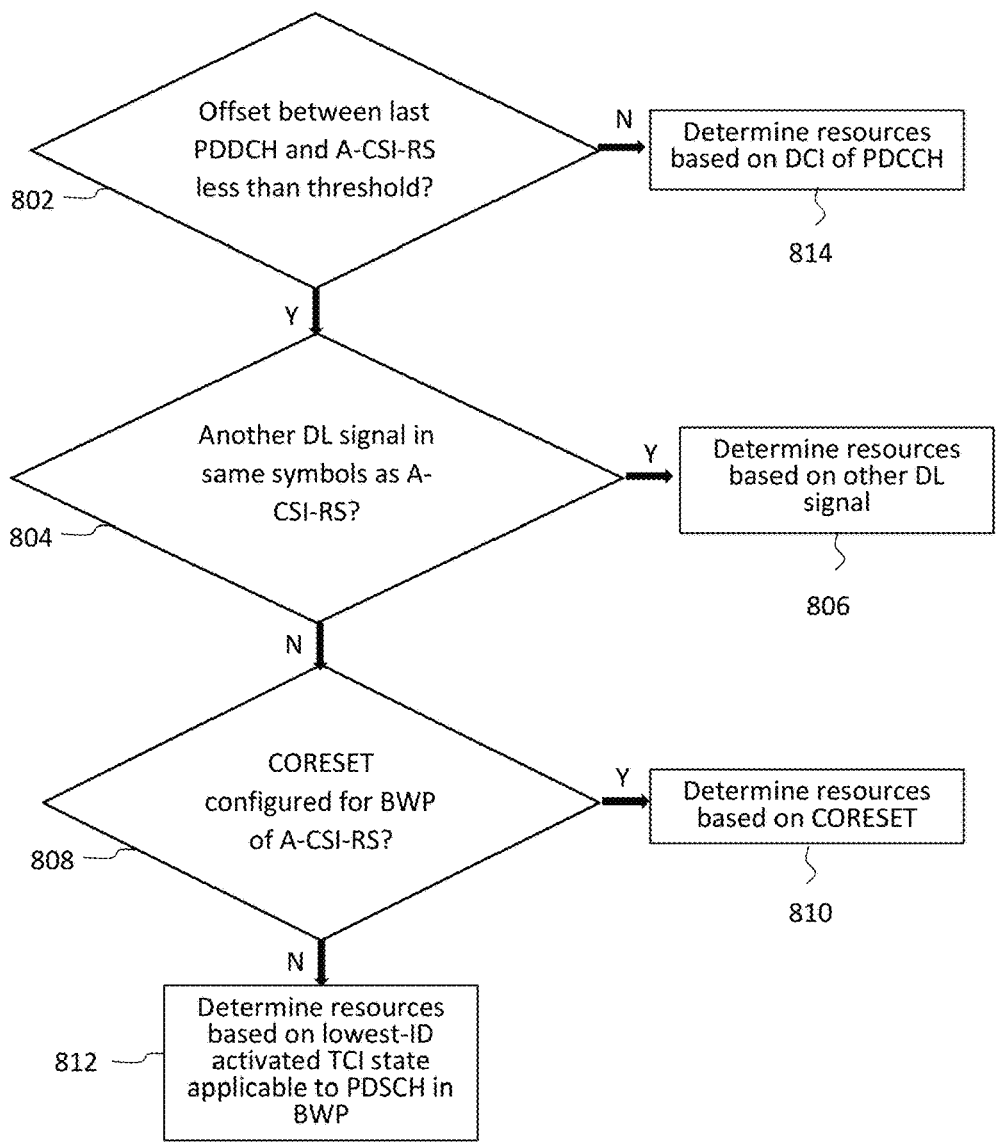
FIG. 8 is a flowchart illustrating a method for determining resources by the UE, according to an embodiment.

FIG. 8 is a flowchart illustrating a method for determining resources by the UE, according to an embodiment. Specifically, FIG. 8 is a detailed description of 704 of FIG. 7. At 802, the UE determines whether a scheduling offset between a latest ending symbol of a last repeated PDCCH and a first symbol of an A-CSI-RS is less than the threshold. Specifically, it is determined whether the scheduling offset between the last symbol of the latest PDCCH carrying the triggering DCI and the first symbol of the A-CSI-RS resources is smaller than the threshold beamSwitchTiming.

If the scheduling offset between the last symbol of the latest PDCCH carrying the triggering DCI and the first symbol of the A-CSI-RS resources is smaller than the UE reported threshold beamSwitchTiming, the UE determines whether there is any other downlink (DL) signal with an indicated TCI state in the same symbols as the CSI-RS, at 804.

If there is any other downlink (DL) signal with an indicated TCI state in the same symbols as the CSI-RS, the UE applies the QCL assumption of the other DL signal when receiving the A-CSI-RS, at 806.

The other DL signal refers to a PDSCH scheduled with an offset greater than or equal to the threshold timeDurationForQCL, an A-CSI-RS scheduled with an offset greater than or equal to the UE reported threshold beamSwitchTiming when the reported value is one of the values { 14,28,48} and enableBeamSwitchTiming-r16 is not provided, an A-CSI-RS scheduled with an offset greater than or equal to 48 when the reported value of beamSwitchTiming-r16 is one of the values {224, 336} and enableBeamSwitchTiming-r16 is provided, a periodic CSI-RS, or a semi-persistent CSI-RS.

If there is not any other DL signal with an indicated TCI state in the same symbols as the CSI-RS, the UE determines whether at least one CORESET is configured for a bandwidth part (BWP) in which the A-CSI-RS is received, at 808.

If at least one CORESET is configured for a BWP in which the A-CSI-RS is received, when receiving the A-CSI-RS, the UE applies the QCL assumption used for the CORESET associated with a monitored SS with the lowest controlResourceSetId in the latest slot in which one or more CORESETs within the active BWP of the serving cell are monitored, at 810.

If the at least one CORESET is not configured for the BWP in which the A-CSI-RS is received, and if the UE is configured with [enableDefaultBeamForCCS], when receiving the A-CSI-RS, the UE applies the QCL assumption of the lowest-ID activated TCI state applicable to the PDSCH within the active BWP of the cell in which the CSI-RS is to be received, at 812.

If the scheduling offset between the last symbol of the latest PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in the DCI, at 814.

Specifically, when the reported value is one of the values of { 14,28,48} and enable BeamSwitchTiming-r16 is not provided, or is greater than or equal to 48 when the reported value of beamSwitchTiming-r16 is one of the values of {224, 336} and enableBeamSwitchTiming-r16 is provided, the UE is expected to apply the QCL assumptions in the indicated TCI states for the aperiodic CSI-RS resources in the CSI triggering state indicated by the CSI trigger field in DCI.

The "latest PDCCH" or "last PDCCH" refers to the PDCCH with the latest ending symbol, among a set of repeated PDCCH or multi-chance PDCCHs which trigger the same A-CSI-RS.

A different and more aggressive approach is to choose the earliest PDCCH as the reference PDCCH. Thus, in a second method with A-CSI-RS beam determination with repetition/multi-chance PDCCH (earliest PDCCH as reference based on last symbol), if the UE is configured to operate with multi-TRP PDCCH repetition or multi-TRP multi-chance PDCCH, where the PDCCH triggers the A-CSI-RS reception:

If the scheduling offset between the last symbol of the earliest PDCCH carrying the triggering DCI and the first symbol of the aperiodic CSI-RS resources is smaller than the UE reported threshold beamSwitchTiming, the UE determines the beam assumption of A-CSI-RS as described above with respect to FIG. 8; and If the scheduling offset between the last symbol of the earliest PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in DCI, as described above in FIG. 8.

The "earliest PDCCH" refers to the PDCCH with the earliest ending symbol, among a set of repeated PDCCH or multi-chance PDCCHs which trigger the same A-CSI-RS.

If the number of repeated PDCCHs is relatively large, defining the ending symbol of the earliest or latest PDCCH as the reference PDCCH, may be too conservative or aggressive for the UE to apply the beam. In this case, an intermediate PDCCH may be used as reference. Indication of such PDCCH may be done via RRC or a fixed constant value in the Specification.

In a third method with A-CSI-RS beam determination with repetition/multi-chance PDCCH (earliest PDCCH as reference based on last symbol), if UE is configured to operate with multi-TRP PDCCH repetition or multi-TRP multi-chance PDCCH, where the PDCCH triggers the A-CSI-RS reception:

If the scheduling offset between the last symbol of the "reference" PDCCH carrying the triggering DCI and the first symbol of the aperiodic CSI-RS resources is smaller than the UE reported threshold beamSwitchTiming, the UE determines the beam assumption of A-CSI-RS from the default rule given as described above in FIG. 8; and If the scheduling offset between the last symbol of the "reference" PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in DCI, as described above in FIG. 8.

The "reference PDCCH" is determined as: the set of M repeated or multi-chance PDCCHs sorted in ascending order of their ending symbol time and numbered from 1 to M; and the reference PDCCH is then determined as the PDCCH number $i_{ref}$ where $i_{ref}$ is configured to the UE via RRC or is fixed value from $\{1, \ldots, M\}$. $i_{ref}$ may be determined as a function of the numerology of the triggering PDCCH, and/or the numerology of the A-CSI-RS.

As an alternative, any of the three methods described above can be written based on the first symbol of the PDCCH, as set forth below.

In a fourth method with A-CSI-RS beam determination with repetition/multi-chance PDCCH (latest PDCCH as reference based on first symbol), if the UE is configured to operate with multi-TRP PDCCH repetition or multi-TRP multi-chance, where the PDCCH triggers the A-CSI-RS reception:

If the scheduling offset between the last symbol of the latest PDCCH carrying the triggering DCI and the first symbol of the aperiodic CSI-RS resources is smaller than the UE reported threshold beamSwitchTiming, the UE determines the beam assumption of A-CSI-RS as described above in FIG. 8; and If the scheduling offset between the last symbol of the latest PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in DCI, as described above in FIG. 8.

The "latest PDCCH" refers to the PDCCH with the latest starting symbol, among a set of repeated PDCCH or multi-chance PDCCHs which trigger the same A-CSI-RS.

In a fifth method with A-CSI-RS beam determination with repetition/multi-chance PDCCH (earliest PDCCH as reference based on first symbol), if the UE is configured to operate with multi-TRP PDCCH repetition or multi-TRP multi-chance PDCCH, where the PDCCH triggers the A-CSI-RS reception:

If the scheduling offset between the last symbol of the earliest PDCCH carrying the triggering DCI and the first symbol of the aperiodic CSI-RS resources is smaller than the UE reported threshold beamSwitchTiming, the UE determines the beam assumption of A-CSI-RS as described above in FIG. 8; and If the scheduling offset between the last symbol of the earliest PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in DCI, as described in FIG. 8.

The "earliest PDCCH" refers to the PDCCH with the earliest starting symbol, among a set of repeated PDCCH or multi-chance PDCCHs which trigger the same A-CSI-RS.

In a sixth method with A-CSI-RS beam determination with repetition/multi-chance PDCCH (earliest PDCCH as reference based on first symbol), if the UE is configured to operate with multi-TRP PDCCH repetition or multi-TRP multi-chance PDCCH, where the PDCCH triggers the A-CSI-RS reception:

If the scheduling offset between the last symbol of the "reference" PDCCH carrying the triggering DCI and the first symbol of the aperiodic CSI-RS resources is smaller than the UE reported threshold beamSwitchTiming, the UE determines the beam assumption of A-CSI-RS, as described above in FIG. 8; and If the scheduling offset between the last symbol of the "reference" PDCCH carrying the triggering DCI and the first symbol of the aperiodic CSI-RS resources is greater than or equal to the UE reported threshold beamSwitchTiming, the UE applies the beam assumptions in the indicated TCI states for the aperiodic CSI-RS resources in the CSI triggering state indicated by the CSI trigger field in DCI, as described above in FIG. 8.

The "reference PDCCH" is determined as: the set of M repeated or multi-chance PDCCHs sorted in ascending order of their starting symbol time and numbered from 1 to M; and the reference PDCCH is determined as the PDCCH number $i_{ref}$, where $i_{ref}$ is configured to the UE via RRC or is fixed value from $\{1, \ldots, M\}$. $i_{ref}$ may be determined as a function of the numerology of the triggering PDCCH, and/or the numerology of the A-CSI-RS.

Uplink Cancellation Timeline

In defining the UE uplink cancellation timeline to cancel an uplink low priority channel (PUSCH and SRS), the reference time is the end of the ending symbol of a PDCCH carrying the uplink (UL) control information (CI), DCI format 2-4. Starting from the reference time, the UE determines a reference uplink region (RUR), which indicates a start and end symbol and start and end resource block (RB). Based on the indicated CI in the DCI, the UE then cancels the uplink transmission in the RUR. It is assumed herein that the UL is carried in a single PDCCH.

Specifically, for the serving cell, the UE determines the first symbol of the $T_{CI}$ symbols to be the first symbol that is after $T'_{proc,2}$ from the end of a PDCCH reception where the UE detects the DCI format 2-4, where $T'_{proc,2}$ is obtained from $T_{proc,2}$ for PUSCH processing capability 2 assuming $d_{2,1}=d_{offset} \cdot 2^{-\mu_{UL}}/2^{-\mu}$ where $d_{offset}$ is provided by delta_Offset"

One approach is to choose the reference time from the end of the latest PDCCH because: 1) The effective decoding latency of the PDCCH carrying UL CI starts from the end of the latest PDCCH (e.g., in case when UE performs soft-combing and joint decoding). In that sense the PDCCH may be considered as long PDCCH which last from the start of the earliest PDCCH to the end of the latest PDCCH. 2) If the reference time is chosen from the end of the earliest PDCCH and a UE that does not perform joint decoding misses the first PDCCH, there will not be sufficient time for decoding of the latest PDCCH and cancellation of the uplink channel. The following method sets the reference time to be the end of the latest PDCCH.

In a first method with UL CI reference time for RUR determination (latest PDCCH), if the UE is configured to receive UL CI in DCI format 2-4 via a PDCCH that is repeated through time, the UE determines the reference uplink region based on the end of the ending symbol of the latest PDCCH among the repeated.

In particular, for an uplink cancellation operation, the UE determines $T_{CI}$ consecutive symbols for the reference uplink region. For the serving cell, the UE determines the first symbol of the $T_{CI}$ symbols to be the first symbol that is after T from the end of the PDCCH reception with the latest ending symbol among the repeated PDCCHs in which the UE detects the DCI format 2_4, where T is the amount of time required for UE to process the cancellation of the uplink channel.

However, by setting the reference time to be the end of the first PDCCH, it is possible for the gNB to schedule uRLLC traffic and, at about the same time, send the UL CI in an early PDCCH to indicate a near reference region, which includes the resources of the uRLLC traffic. Had it determined the reference region from the end of the latest PDCCH, it would not have been able to indicate a reference region that overlaps with the uRLLC traffic. Therefore, determining the reference time from the end of the earliest PDCCH may improve the uRLLC latency/reliability. The following method defines the reference time from the end of the earliest PDCCH.

In a second method with UL CI reference time for RUR determination (earliest PDCCH), if the UE is configured to receive UL CI in DCI format 2-4 via a PDCCH which is repeated through time, the UE determines the reference uplink region based on the end of the ending symbol of the earliest PDCCH among the repeated PDCCHs.

In particular, for an uplink cancellation operation, the UE determines $T_{CI}$ consecutive symbols for the reference uplink region. For the serving cell, the UE determines the first symbol of the $T_{CI}$ symbols to be the first symbol that is after T from the end of the PDCCH reception with the earliest ending symbol among the repeated PDCCHs in which the UE detects the DCI format 2-4, where T is the amount of time required for the UE to process the cancellation of the uplink channel.

Depending on applicability conditions, the network may configure the UE with a reference PDCCH (e.g. either earliest or latest PDCCH), to determine the reference uplink region.

In a third method with UL CI reference time for RUR determination (RRC configuration of a reference PDCCH), if the UE is configured to receive UL CI in DCI format 2-4 via a PDCCH that is repeated through time, the UE determines the reference uplink region based on the end of the ending symbol of a "reference" PDCCH among the repeated PDCCHs.

In particular, for an uplink cancellation operation, the UE determines $T_{CI}$ consecutive symbols for the reference uplink region. For the serving cell, the UE determines the first symbol of the $T_{CI}$ symbols to be the first symbol that is after T from the end of a "reference" PDCCH reception among the repeated PDCCHs in which the UE detects the DCI format 2-4, where T is the amount of time required for UE to process the cancellation of the uplink channel.

The reference PDCCH is configured to the UE via RRC to be either the earliest, latest, or a specific PDCCH among the repeated PDCCHs.

In case of multi-chance PDCCHs, multiple PDCCHs are transmitted independently to perform the same task (e.g. scheduling the same PUSCH, PDSCH, indicating the UL CI, etc.). Therefore, it is more natural to define the timeline and the related operation for UL CI independently for each multi-chance repetition.

In a fourth method with UL CI reference time for RUR determination (multi-chance PDCCH), if the UE is configured to receive UL CI in DCI format 2-4 via a multi-chance PDCCH transmission, the UE performs the following independently for each of the PDCCHs:

For an uplink cancellation operation, the UE determines $T_{CI}$ consecutive symbols for the reference uplink region. For the serving cell, the UE determines the first symbol of the $T_{CI}$ symbols to be the first symbol that is after T from the end of the PDCCH reception in which the UE detects the DCI format 2-4, where T is the amount of time required for UE to process the cancellation of the uplink channel.

Applicability of UL CI

Figure 9:
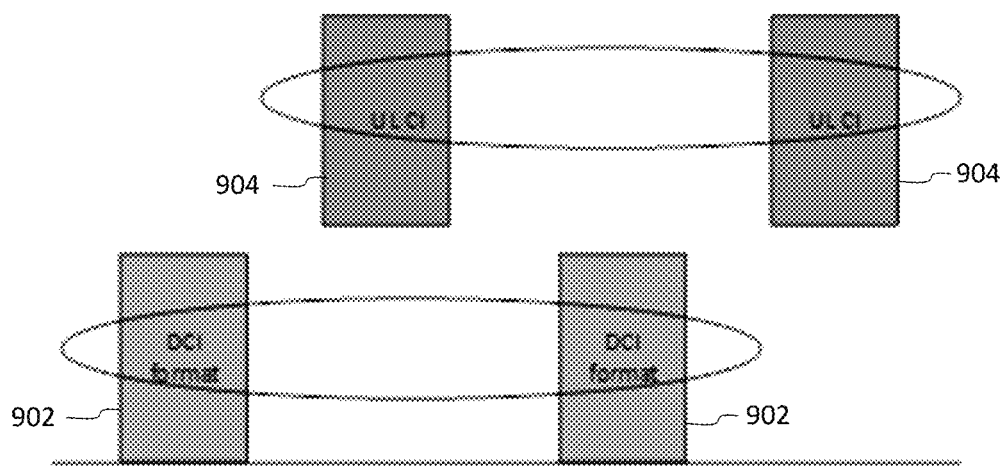
FIG. 9 is a diagram illustrating two repetitions of the DCI formats, according to an embodiment.

In Rel-15/16, UL CI is applicable only when the PDCCH scheduling the PUSCH or sounding reference signal (SRS) ends before the start of the PDCCH carrying the UL CI. FIG. 9 is a diagram illustrating two repetitions of the DCI formats, according to an embodiment. Two repetitions of DCI formats 902 are assumed to schedule a PUSCH and two repetitions of the UL CI 904 (carried in DCI format 2-4) are assumed to provide cancellation information for the scheduled PUSCH. This scenario may not be allowed as the first repetition of the UL CI is received before the second repetition of the DCI format. However, this should be supported as the CI information is available at the network side right after the transmission of the first repetition of the DCI format.

In a first method with applicability of UL CI (earliest UL CI and earliest DCI format), if the UE is configured to receive UL CI in DCI format 2-4 via a PDCCH, which is repeated through time or via multi-chance PDCCH, and a DCI format scheduling PUSCH or SRS, the UE determines the applicability of the UL CI based on the earliest repetitions.

If the PUSCH transmission or the SRS transmission is scheduled by a DCI format, the indication by the DCI format 2-4 is applicable to the PUSCH transmission or SRS transmission only if the last symbol of the earliest PDCCH reception among the repeated or multi-chance PDCCHs providing the DCI format is earlier than the first symbol of the earliest PDCCH reception among the repeated or multi-chance PDCCHs providing the DCI format 2-4.

In a second method with applicability of UL CI (earliest UL CI and latest DCI format), if the UE is configured to receive UL CI in DCI format 2-4 via a PDCCH which is repeated through time or via multi-chance PDCCH, and a DCI format scheduling PUSCH or SRS, the UE determines the applicability of the UL CI based on the earliest repetitions.

If the PUSCH transmission or the SRS transmission is scheduled by a DCI format, the indication by the DCI format 2-4 is applicable to the PUSCH transmission or SRS transmission only if the last symbol of the earliest PDCCH reception among the repeated or multi-chance PDCCHs providing the DCI format is earlier than the first symbol of the latest PDCCH reception among the repeated or multi-chance PDCCHs providing the DCI format 2-4.

In a third method with applicability of UL CI (latest UL CI and earliest DCI format), if the UE is configured to receive UL CI in DCI format 2-4 via a PDCCH, which is repeated through time or via multi-chance PDCCH, and a DCI format scheduling PUSCH or SRS, the UE determines the applicability of the UL CI based on the earliest repetitions.

If the PUSCH transmission or the SRS transmission is scheduled by a DCI format, the indication by the DCI format 2-4 is applicable to the PUSCH transmission or SRS transmission only if the last symbol of the latest PDCCH reception among the repeated or multi-chance PDCCHs providing the DCI format is earlier than the first symbol of the earliest PDCCH reception among the repeated or multi-chance PDCCHs providing the DCI format 2-4.

In a fourth method with applicability of UL CI (latest UL CI and latest DCI format), if the UE is configured to receive UL CI in DCI format 2-4 via a PDCCH, which is repeated through time or via multi-chance PDCCH, and a DCI format scheduling PUSCH or SRS, the UE determines the applicability of the UL CI based on the earliest repetitions.

If the PUSCH transmission or the SRS transmission is scheduled by a DCI format, the indication by the DCI format 2-4 is applicable to the PUSCH transmission or SRS transmission only if the last symbol of the latest PDCCH reception among the repeated or multi-chance PDCCHs providing the DCI format is earlier than the first symbol of the latest PDCCH reception among the repeated or multi-chance PDCCHs providing the DCI format 2-4.

In essence, the issue with respect to applicability of UL CI exists even when the PDCCH carrying UL CI is not configured with repetition. In fact, the problem exists when the UL CI is transmitted in a single PDCCH, but the DCI format scheduling the PUSCH is transmitted through PDCCH repetition or multi-chance.

Figure 10:
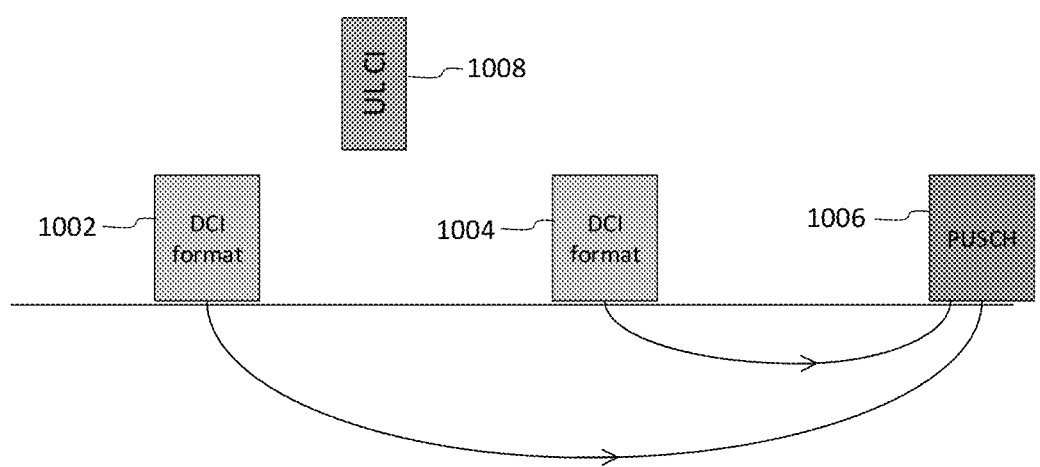
FIG. 10 is a diagram illustrating uplink cancellation indication with PDCCH repetition, according to an embodiment.

FIG. 10 is a diagram illustrating uplink cancellation indication with PDCCH repetition, according to an embodiment. Similar to the four methods above, two different possibilities may be considered to determine the applicability of UL CI based on the earliest or the latest PDCCH scheduling the PUSCH or SRS transmission.

In a fifth method with applicability of UL CI (single UL CI and earliest DCI format), if the UE is configured to receive UL CI in DCI format 2-4 and multiple PDCCHs 1002 and 1004, via repetition or multi-chance, scheduling PUSCH 1006 or SRS, the UE determines the applicability of UL CI 1008 based on the earliest PDCCH 1002.

If the PUSCH transmission or the SRS transmission is scheduled by a DCI format that is transmitted through repetitions of a number of PDCCHs or through a number of multi-chance PDCCHs, the indication by the DCI format 2-4 is applicable to the PUSCH transmission or SRS transmission only if the last symbol of the earliest PDCCH reception among the repeated or multi-chance PDCCHs providing the DCI format is earlier than the first symbol of the PDCCH reception providing the DCI format 2-4.

In a sixth method with applicability of UL CI (single UL CI and latest DCI format), if the UE is configured to receive UL CI in DCI format 2-4 and multiple PDCCHs, via repetition or multi-chance, scheduling PUSCH or SRS, the UE determines the applicability of the UL CI based on the latest PDCCH.

If the PUSCH transmission or the SRS transmission is scheduled by a DCI format that is transmitted through repetitions of a number of PDCCHs or through a number of multi-chance PDCCHs, the indication by the DCI format 2-4 is applicable to the PUSCH transmission or SRS transmission only if the last symbol of the latest PDCCH reception among the repeated or multi-chance PDCCHs providing the DCI format is earlier than the first symbol of the PDCCH reception providing the DCI format 2-4.

Close Loop Power Control for PUSCH

In Rel-15/16, the UE determines the transmit power for an PUSCH transmission occasion based on a variety of parameters, among which there is a closed loop power control delivered to the UE via a transmission power command (TPC) field in the scheduling DCI. A TPC accumulator, accumulates the values of the TPC through time and applies the accumulated value to determine the PUSCH power.

According to a legacy PUSCH PC rule, if a UE transmits a PUSCH on active UL BWP b of carrier f of serving cell c using parameter set configuration with index j and PUSCH power control adjustment state with index 1, the UE determines the PUSCH transmission power $P_{PUSCH,b,f,c}(i,j,q_d,l)$ in PUSCH transmission occasion i as set forth in Equation (1) below:

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{cases} \quad (1)$$

$P_{CMAX,f,c}(i)$ is configured UE transmit power and depends on the waveform;

$P_{O\_PUSCH,b,f,c}(j)$ is a beam specific control parameter;

$M_{RB,b,f,c}^{PUSCH}(i)$ is the bandwidth of the PUSCH resource assignment expressed in number of resource blocks for PUSCH transmission occasion i on active UL BWP b of carrier f of serving cell c and µ is a SCS of PUSCH;

$PL_{b,f,c}(q_d)$ is a downlink pathloss estimate in dB calculated by the UE using reference signal (RS) index $q_d$ for the active DL BWP;

$\alpha_{b,f,c}(j)$ is the pathloss compensation factor $\in \{0, 0.4, 0.5, 0.6, 0.7, 0.8, 0.9\}$;

$\Delta_{TF,b,f,c}(i)$ is the modulation coding scheme (MCS)-dependent component, referred to as transport format (TF), which allows the transmitted power per resource block to be adapted according to the information data rate; and $f_{b,f,c}(i,l)$ is the accumulated or absolute power correction value.

The role of $f_{b,f,c}(i,l)$, which is also referred to as the accumulated TPC is for the gNB to correct the recent transmitted power due to change in the environment or any other factors which may have not been taken into account dynamically. It is calculated as set forth in Equation (2) below:

$$f_{b,f,c}(i, l) = f_{b,f,c}(i - i_0, l) + \sum\nolimits (m, l) \quad (2)$$

This is the PUSCH power control adjustment state l for active UL BWP b of carrier f of serving cell c and PUSCH transmission occasion i if the UE is not provided tpc-Accumulation, where:

The $\delta_{PUSCH, b,f,c}$ values are given in Table 7.1.1-1; and $$\sum\nolimits_{\cdot} (m, l)$$

is a sum of TPC command values in a set $D_i$ of TPC command values with cardinality $\mathcal{C}(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i.

As described above, for a PUSCH transmission occasion i, the UE calculated the sum of TPC command values in the DCIs that have been received from a first start time to a second end time determined based on $K_{PUSCH}(i)$ for PUSCH transmission occasion i. When the PDCCH is repeated two things need to be ensured: the TPC command values of all repeated PDCCHs which schedule the same PUSCH should be counted once for the purpose of calculation of $f_{b,f,c}(i,l)$; and $K_{PUSCH}(i)$ needs to be defined with respect to a reference PDCCH The following methods define UE behavior in case the scheduling PDCCH is configured with repetitions.

In a first method with PUSCH TPC command (counting the TPC commands and reference time for $K_{PUSCH}(i)$), when a number of M repeated or multi-chance PDCCHs schedule the same PUSCH occasion i, the UE determines the transmit power of the PUSCH using the legacy PUSCH PC rule with the following modifications.

The M TPC command values in the DCIs carried by the repeated or multi-chance PDCCHs that schedule the same PUSCH occasion i, are only counted once. That is, only one of the TPC command values among the M values is used to update the summation in Equation (3) below:

$$f_{b,f,c}(i, l) = f_{b,f,c}(i - i_0, l) + \sum\nolimits_{\cdot} (m, l) \quad (3)$$

If a PUSCH transmission is scheduled by a DCI format, $K_{PUSCH}(i)$ is a number of symbols for active UL BWP b of carrier f of serving cell c after a last symbol of a reference PDCCH reception among the repeated or multi-chance PDCCHs and before a first symbol of the PUSCH transmission. The reference PDCCH can be chosen as any of the following options:

1) Reference PDCCH is the PDCCH with the earliest starting symbol among the repeated or multi-chance PDCCHs;
2) Reference PDCCH is the PDCCH with the latest starting symbol among the repeated or multi-chance PDCCHs; and
3) Reference PDCCH is indicated to the UE via RRC or as a function of number of repeated PDCCHs. For example, reference PDCCH is the k-th PDCCH, where the PDCCHs are sorted in ascending order of their start time.

TDRA Field

With TDM schemes, a modification of the TDRA field may be necessary. For an uRLLC application, a fast scheduling of PDSCH may be needed. That is, the gap between the first PDCCH and the scheduled PDSCH should not be too large. To ensure low latency scheduling of PDSCH, reference PDCCH for applying the TDRA field as well as proper conditions on the TDRA filed, including $K_0$ and SLIV should be applied. Two alternatives are provided for PDCCH-to-PDSCH gap for TDM-based schemes.

Figure 11:
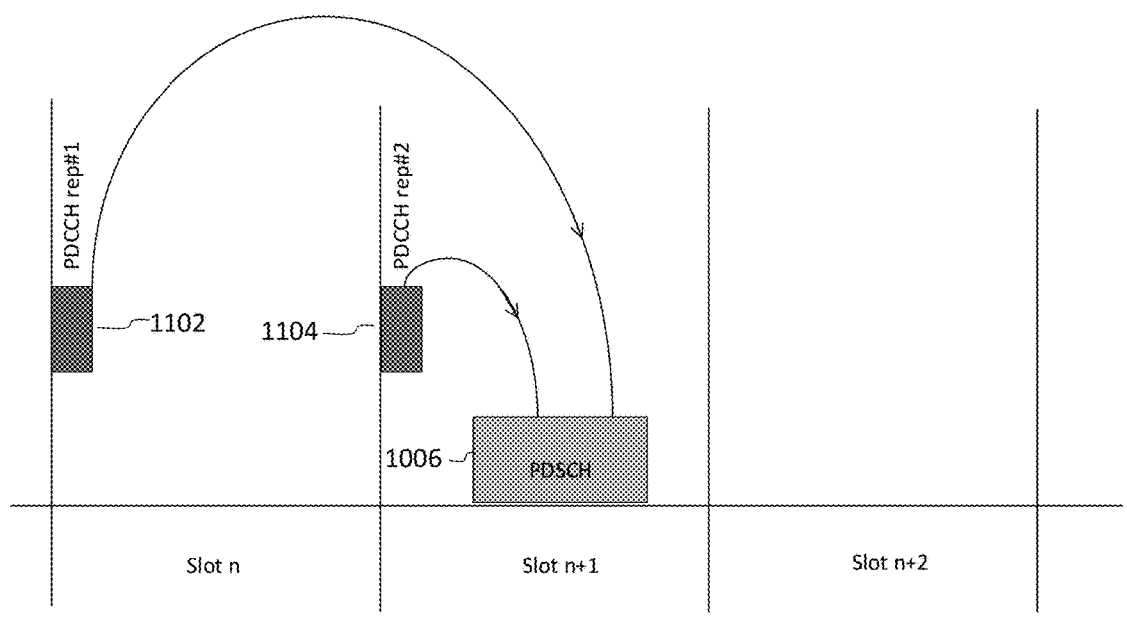
FIG. 11 is a diagram illustrating a first alternative in which PDSCH is not earlier than the last PDCCH slot, according to an embodiment.

FIG. 11 is a diagram illustrating a first alternative in which PDSCH is not earlier than the last PDCCH slot, according to an embodiment. $K_0=1$ and $K_0=0$ for a first PDCCH 1102 and a second PDCCH 1104, respectively, which schedule PDSCH 1106 in slot n+1. The first alternative is advantageous in that there is less of a, or no, buffering requirement, but disadvantageous in that there is a larger latency.

Figure 12:
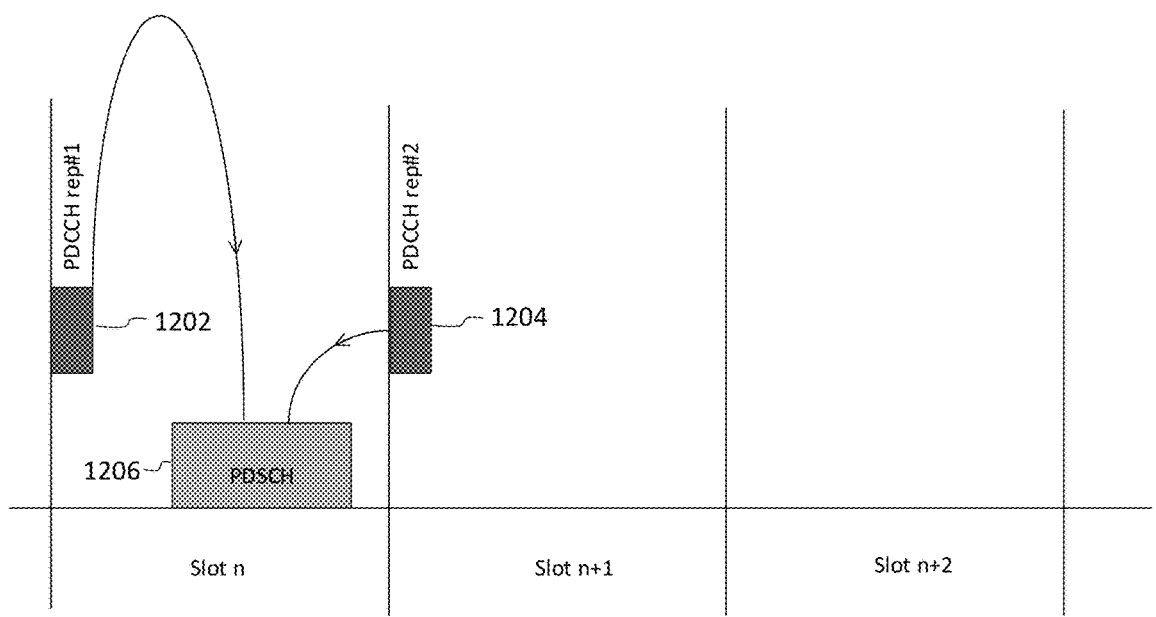
FIG. 12 is a diagram illustrating a second alternative in which PDSCH is not earlier than the first PDCCH slot, according to an embodiment.

FIG. 12 is a diagram illustrating a second alternative in which PDSCH is not earlier than the first PDCCH slot, according to an embodiment. $K_0=0$ and $K_0=-1$ for a first PDCCH 1202 and a second PDCCH 1204, respectively, which schedule PDSCH 1206 in slot n. The second alternative is advantageous in that there is more of a buffering requirement, and is disadvantageous in that there is a smaller latency.

In order to ensure low latency requirements for uRLLC, a slot-level non-causal scheduling slot offset $K_0$ is proposed.

In a first method with negative scheduling offset $K_0$, a UE operating with multi-TCI PDCCH transmission by multi-TRP, in TDM mode can be indicated via DCI a TDRA row with a negative value of scheduling slot offset $K_0$. The UE may declare a capability to support negative $K_0$.

If the UE reports the negative $K_0$ capability, the network may configure the UE with a TDRA table which includes at least one row with a negative value of $K_0$ If the UE does not report the negative $K_0$ capability, all rows of the TDRA table have non-negative value of $K_0$.

With a negative offset $K_0$, when the UE misses some of the early DCIs, it may end up buffering many symbols of the PDSCH. Therefore, the UE may indicate a minimum value L>0 such that it only supports $K_0 \geq -L$. By appropriate reporting of L, the UE may mitigate the buffering requirement while ensuring the uRLLC latency.

In a second method with negative scheduling offset $K_0$ (minimum supported scheduling offset), a UE operating with multi-TCI PDCCH transmission by multi-TRP, in TDM mode, reports to the network as a capability a value of MaxNegativeScheudlingOffset≥0. The network ensures that a DCI scheduling PDSCH indicates to a row of the TDRA table with a scheduling slot offset $K_0 \geq -$MaxNegativeScheudlingOffset.

The UE may also report multiple candidate values MaxNegativeScheudlingOffset_UE and the network configures the UE via RRC a final value of MaxNegativeScheudlingOffset.

For example, if the UE reports a value of 2 for MaxNegativeScheudlingOffset, the network ensures that every DCI (repetition, no repetition, multi-chance) scheduling a PDSCH indicates a $K_0 \geq -2$.

Reporting of supported scheduling offset may also be done in a finer granularity (e.g. number of symbols). The following methods is based on this approach.

In a third method with minimum PDCCH-to-PDSCH time gap, a UE operating with multi-TCI PDCCH transmission by multi-TRP, in TDM mode, reports to the network as a capability a value of MaxNegativeScheudlingOffsetSymbols≥0. The network ensures that a DCI scheduling PDSCH indicates to a row of the TDRA table such that:

If the PDCCH ends at time $T_{cch}$ and schedules a PDSCH starting at time $T_{sch} \leq T_{cch}$, then $T_{cch} - T_{sch} \leq$ MaxNegativeScheudlingOffsetSymbols × $T_{symbol,\mu}$ where $T_{symbol,\mu}$ is the OFDM symbol duration based on a reference numerology μ which may be defined based on the numerology of the PDCCH and that of the scheduled PDSCH.

The UE may also report multiple candidate values MaxNegativeScheudlingOffset_UE, and the network configures the UE via RRC a final value of MaxNegativeScheudlingOffset.

For example, if the UE reports a value of 5 for MaxNegativeScheudlingOffsetSymbols, and if the PDCCH and PDSCH have the same numerology, the network ensures that for every DCI (repetition, no repetition, multi-chance) which schedules a PDSCH, there are at most 5 OFDM symbols between the end of start of PDSCH and the end of the scheduling PDCCH if the PDSCH starts before the end of the PDCCH.

PUCCH Resource Determination

Referring back to FIG. 7, the determining of resources in 704 may include the determining of resources for transmission of an ACK/NACK over a PUCCH.

Specifically, in 3GPP Rel-15/16, the UE determines the PUCCH resource to transmit ACK/NACK according the PUCCH resource indicator (PRI) in a last ACK/NACK, where the detected DCIs are ordered in ascending order of the serving cell index for a given MO index and then in ascending order of MO indices. With TDM schemes, the network may or may not choose to update the PRI from repetition to repetition. In case the network does not update the PRI, this should be specified such that it is ensured that the PUCCH resource is not overridden by the network and UE does not need to cancel current PUCCH transmission.

In a first method with PRI determined from any repetitions (PRI from last repetition), if the UE is configured to operate with multi-TCI PDCCH transmission by multi-TRP and L PDCCHs schedule the same PDSCH, the UE determines the PUCCH resource from the PRI field in the PDCCH with latest start symbol.

If multiple PDCCHs among the above PDCCHs have the same start symbol, the UE applies the PRI value from one of the following alternatives:

A) the UE applies the PRI from any of the PDCCHs;
B) the UE expects that all the PDCCHs indicate the same slot for PUCCH transmission;
C) the UE applies the PRI from the PDCCH that is associated with a specific CORESET index (e.g. lowest CORESET index);
D) the UE applies the PRI from the PDCCH, which is associated with a specific search space index, e.g. lowest SS index; or
E) the UE applies the PRI from the PDCCH which schedules the PDSCH with the latest start time.

HARQ-ACK Timing Slot Offset

In some implementations, in case of the PDCCH repetition where the PDCCH does not schedule a PDSCH, the HARQ-ACK timing can be defined from the slot in which the PDCCH is received. Examples of such PDCCHs include, PDCCH providing the release of semi-persistent scheduling (SPS) PDSCH configuration, PDCCH indicating secondary cell (SCell) dormancy without scheduling a PDSCH, and PDCCH requesting Type-3 HARQ-ACK codebook without scheduling a PDSCH.

With PDCCH repetition, a reference PDCCH is defined to determine the slot of the PUCCH with HARQ-ACK transmission. The reference PDCCH is defined as the PDCCH among the repetitions, which end later in time. In particular, with reference to slots for PUCCH transmissions, if the UE detects a DCI format indicating SPS PDSCH release through a PDCCH reception ending in slot n, the UE provides corresponding HARQ-ACK information in a PUCCH transmission within slot n+k, where k is a number of slots and is indicated by the PDSCH-to-HARQ_feedback timing indicator field in the DCI format, if present, or provided by RRC. k=0 corresponds to the last slot of the PUCCH transmission that overlaps with the reference PDCCH reception.

In-Order or Out-of-Order

Figure 13:
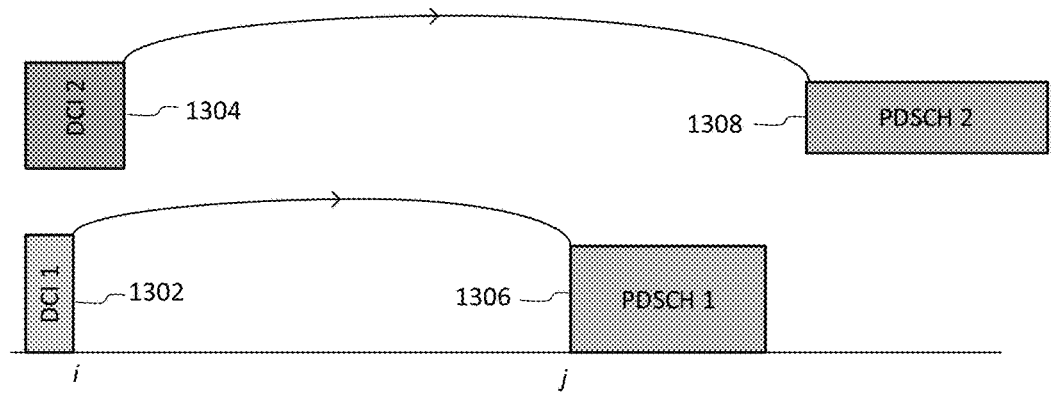
FIG. 13 is a diagram illustrating in-order PDSCH transmission, according to an embodiment.

In Rel-15/16, certain in-order operations are defined and supported. Among the in-order operations is PDCCH-to-PDSCH. A "later" PDCCH must schedule a "later" PDSCH. FIG. 13 is a diagram illustrating in-order PDSCH transmission, according to an embodiment. A first PDCCH 1302 is received before a second PDCCH 1304, and a first PDSCH 1306 is received before a second PDSCH 1308.

Figure 14:
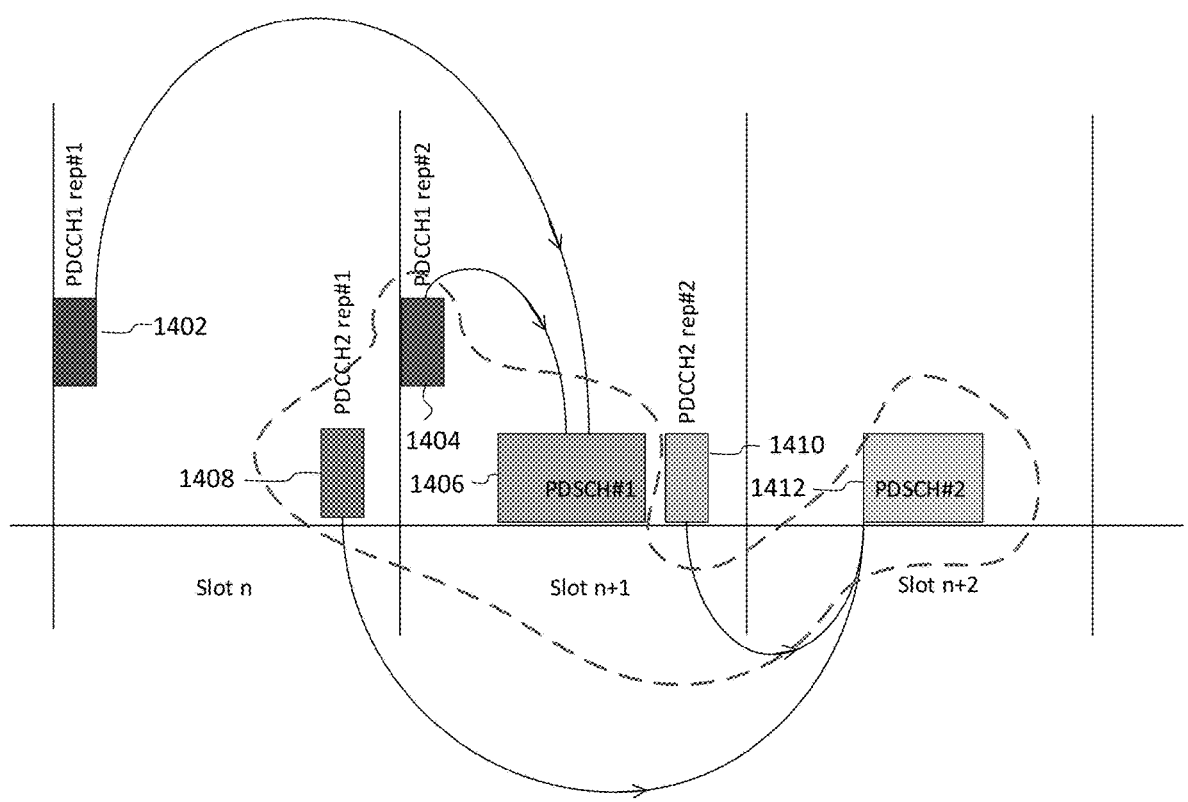
FIG. 14 is a diagram illustrating out-of-order operation with PDCCH repetition, according to an embodiment.

Such a restriction may not be necessary if the PDCCHs are repeated in a time domain. FIG. 14 is a diagram illustrating out-of-order operation with PDCCH repetition, according to an embodiment. A first repetition of a first PDDCH 1402 and a second repetition of the first PDCCH 1404 schedule a first PDSCH 1406 in slot n+1. A first repetition of a second PDCCH 1408 and a second repetition of a second PDCCH 1410 schedule a second PDSCH 1412. When the first repetition of the first PDCCH 1402 is missed, the second repetition of the first PDCCH 1404 and the first repetition of the second PDCCH 1408 create an out-of-order (OoO) operation.

The in-order operation was introduced to allow for smooth pipelining with different processing blocks at the UE. However, with PDCCH repetitions, assuming no PDCCH is missed, the repetitions can be effectively considered as along PDCCH starting from the first symbol of the first repetition and ending in the last symbol of the last repetition. If the UE misses a first PDCCH repetition, then it will effectively experience an OoO loop. Whether or not to allow such a scenario can be described as UE behavior.

With a conservative solution, an in-order condition can be applied between any pairs of PDCCH repetitions.

In a first method with in-order operation between all the repetitions, when the UE is configured with M-TRP operation and PDCCH repetitions such that PDCCH repetition #1 to PDCCH repetition #L all schedule a single PDSCH, where the PDCCHs are numbered in ascending order of their start time, for any two HARQ process IDs in a given scheduled cell, if the UE is scheduled to start receiving a first PDSCH starting in symbol j by any PDCCH among PDCCH repetitions ending in symbol i, the UE is not expected to be scheduled to receive a PDSCH starting earlier than the end of the first PDSCH with a any PDCCH among repetitions that ends later than symbol i.

It is also possible to have a less conservative behavior which allows a certain level of OoO operation.

In a second method with in-order operation between last repetitions, when the UE is configured with M-TRP operation and PDCCH repetitions such that PDCCH repetition #1 to PDCCH repetition #L all schedule a single PDSCH, where the PDCCHs are numbered in ascending order of their start time, for any two HARQ process IDs in a given scheduled cell, if the UE is scheduled to start receiving a first PDSCH starting in symbol j by a last PDCCH among PDCCH repetitions ending in symbol i, the UE is not expected to be scheduled to receive a PDSCH starting earlier than the end of the first PDSCH by the last PDCCH among PDCCH repetitions that ends later than symbol i. FIG. 14 is supported by this second method since the last repetitions among the two PDCCH repetitions result in in-order operation.

Figure 15:
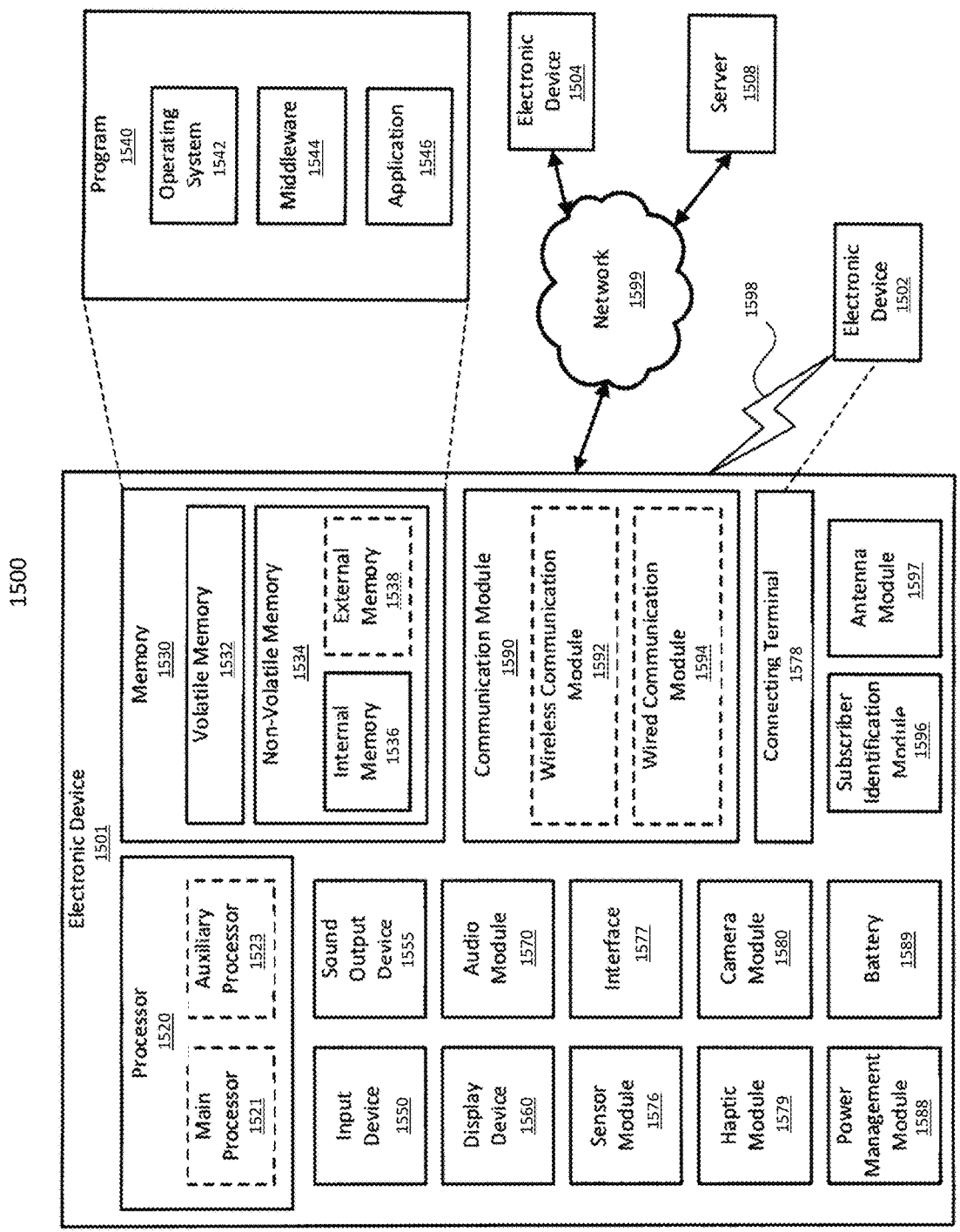
FIG. 15 is a block diagram of an electronic device in a network environment, according to an embodiment.

FIG. 15 is a block diagram of an electronic device in a network environment, according to one embodiment. Referring to FIG. 15, an electronic device 1501 in a network environment 1500 may communicate with an electronic device 1502 via a first network 1598 (e.g., a short-range wireless communication network), or an electronic device 1504 or a server 1508 via a second network 1599 (e.g., a long-range wireless communication network). The electronic device 1501 may communicate with the electronic device 1504 via the server 1508. The electronic device 1501 may include a processor 1520, a memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In one embodiment, at least one (e.g., the display device 1560 or the camera module 1580) of the components may be omitted from the electronic device 1501, or one or more other components may be added to the electronic device 1501. Some of the components may be implemented as a single integrated circuit (IC). For example, the sensor module 1576 (e.g., a fingerprint sensor, an iris sensor, or an illuminance sensor) may be embedded in the display device 1560 (e.g., a display).

The processor 1520 may execute, for example, software (e.g., a program 1540) to control at least one other component (e.g., a hardware or a software component) of the electronic device 1501 coupled with the processor 1520, and may perform various data processing or computations. As at least part of the data processing or computations, the processor 1520 may load a command or data received from another component (e.g., the sensor module 1576 or the communication module 1590) in volatile memory 1532, process the command or the data stored in the volatile memory 1532, and store resulting data in non-volatile memory 1534. The processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or execute a particular function. The auxiliary processor 1523 may be implemented as being separate from, or a part of, the main processor 1521.

The auxiliary processor 1523 may control at least some of the functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). The auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. The display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. The audio module 1570 may obtain the sound via the input device 1550, or output the sound via the sound output device 1555 or a headphone of an external electronic device 1502 directly (e.g., wired) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. The sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device 1502 directly (e.g., wired) or wirelessly. The interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device 1502. The connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or an electrical stimulus which may be recognized by a user via tactile sensation or kinesthetic sensation. The haptic module 1579 may include, for example, a motor, a piezoelectric element, or an electrical stimulator.

The camera module 1580 may capture a still image or moving images. The camera module 1580 may include one or more lenses, image sensors, image signal processors, or flashes.

The power management module 1588 may manage power supplied to the electronic device 1501. The power management module 1588 may be implemented as at least part of, for example, a power management integrated circuit (PMIC).

The battery 1589 may supply power to at least one component of the electronic device 1501. The battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the AP) and supports a direct (e.g., wired) communication or a wireless communication. The communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or a standard of the Infrared Data Association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. The antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. All or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

One embodiment may be implemented as software (e.g., the program 1540) including one or more instructions that are stored in a storage medium (e.g., internal memory 1536 or external memory 1538) that is readable by a machine (e.g., the electronic device 1501). For example, a processor of the electronic device 1501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for resource allocation by a user equipment (UE):
    receiving, at the UE, repeated physical downlink control channels (PDCCHs) from a network, each of the repeated PDCCHs comprising downlink control information (DCI) that schedules reception of a same physical downlink shared channel (PDSCH) at the UE, wherein the repeated PDCCHs are ordered based on their start or end times; and
    in response to the PDSCH being scheduled for reception by a PDCCH, determining, at the UE, a last PDCCH of another set of repeated PDCCHs, which ends after the PDCCH and schedules another PDSCH for reception only after an end of the PDSCH.

2. The method of claim 1, further comprising:
    determining, by the UE, resources for at least one of transmission and reception at the UE, from the PDCCH having a latest start symbol or a latest ending symbol among the repeated PDCCHs.

3. The method of claim 2, wherein the PDCCH has the latest ending symbol among the repeated PDCCHs, and determining the resources comprises:
    determining whether an offset between the latest ending symbol of the PDCCH and a first symbol of an asynchronous-channel state information-reference signal (A-CSI-RS) is less than a threshold;
    in response to the offset being greater than or equal to the threshold, determining a transmission configuration indicator (TCI) state for A-CSI-RS reception based on the DCI of the PDCCH; and
    in response to the offset being less than the threshold, determining whether another downlink signal, having an indicated TCI state, is in same symbols as the A-CSI-RS.

4. The method of claim 3, further comprising:
    in response to the other downlink signal being in the same symbols as the A-CSI-RS, determining the TCI state for A-CSI-RS reception based on the other downlink signal; and
    in response to the other downlink signal not being in the same symbols as the A-CSI-RS, determining whether at least one control resource set (CORESET) is configured for a bandwidth part (BWP) in which the A-CSI-RS is received.

5. The method of claim 4, further comprising:
    in response to the at least one CORESET being configured for the BWP, determining the TCI state for A-CSI-RS reception based on a CORESET associated with a monitored search space (SS) with a lowest identifier in a latest slot in which one or more CORESETs within the BWP are monitored; and
    in response to the at least one CORESET not being configured for the bandwidth part, determining the TCI state for A-CSI-RS reception based on a lowest identifier activated TCI state applicable to the PDSCH within the BWP.

6. The method of claim 2, wherein determining the resources comprises determining the resources for transmission of an acknowledgement/negative acknowledgment (ACK/NACK) over a physical uplink control channel (PUCCH) based on a PUCCH resource indicator (PRI) of the PDCCH.

7. The method of claim 6, wherein the PDCCH is one of a plurality of PDCCHs, from the repeated PDCCHs, having the latest start symbol, and the PDCCH:
    is any of the plurality of PDCCHs;
    is associated with a specific CORESET;
    is associated with a specific SS; or
    schedules reception of the PDSCH with a latest start time.

8. The method of claim 7, wherein the specific CORESET has a lowest index among CORESETs of the plurality of PDCCHs.

9. The method of claim 7, wherein the specific SS has a lowest index among SSs of the plurality of PDCCHs.

10. The method of claim 2, wherein:
    the PDCCH has the latest ending symbol among the repeated PDCCHs;
    determining the resources comprises determining a slot for transmission of an acknowledgement (ACK)/negative ACK (NACK) over a physical uplink control channel (PUCCH) based on a slot offset indicated in the PDCCH; and
    the PDCCH indicates a release of a semi-persistent scheduling (SPS) PDSCH configuration, indicates secondary cell (SCell) dormancy, or requests transmission of a Type-3 HARQ-ACK codebook.

11. A user equipment (UE) comprising:
    a processor; and
    a non-transitory computer readable storage medium storing instructions that, when executed, cause the processor to:
        receive repeated physical downlink control channels (PDCCHs) from a network, each of the repeated PDCCHs comprising downlink control information (DCI) that schedules reception of a same physical downlink shared channel (PDSCH) at the UE, wherein the repeated PDCCHs are ordered based on their start or end times; and
        in response to the PDSCH being scheduled for reception by a PDCCH, determine a last PDCCH of another set of repeated PDCCHs, which ends after the PDCCH and schedules another PDSCH for reception only after an end of the PDSCH.

12. The UE of claim 11, wherein the instructions further cause the processor to:
    determine resources for at least one of transmission and reception at the UE, from the PDCCH having a latest start symbol or a latest ending symbol among the repeated PDCCHs.

13. The UE of claim 12, wherein the PDCCH has the latest ending symbol among the repeated PDCCHs, and, in determining the resources, the instructions further cause the processor to:
    determine whether an offset between the latest ending symbol of the PDCCH and a first symbol of an asynchronous-channel state information-reference signal (A-CSI-RS) is less than a threshold;

in response to the offset being greater than or equal to the threshold, determine a transmission configuration indicator (TCI) state for A-CSI-RS reception based on the DCI of the PDCCH; and in response to the offset being less than the threshold, determine whether another downlink signal, having an indicated TCI state, is in same symbols as the A-CSI-RS.

14. The UE of claim 13, wherein the instructions further cause the processor to:

in response to the other downlink signal being in the same symbols as the A-CSI-RS, determine the TCI state for A-CSI-RS reception based on the other downlink signal; and in response to the other downlink signal not being in the same symbols as the A-CSI-RS, determine whether at least one control resource set (CORESET) is configured for a bandwidth part (BWP) in which the A-CSI-RS is received.

15. The UE of claim 14, wherein the instructions further cause the processor to:

in response to the at least one CORESET being configured for the BWP, determine the TCI state for A-CSI-RS reception based on a CORESET associated with a monitored search space (SS) with a lowest identifier in a latest slot in which one or more CORESETs within the BWP are monitored; and in response to the at least one CORESET not being configured for the bandwidth part, determine the TCI state for A-CSI-RS reception based on a lowest identifier activated TCI state applicable to the PDSCH within the BWP.

16. The UE of claim 12, wherein, in determining the resources, the instructions further cause the processor to determine the resources for transmission of an acknowledgement/negative acknowledgment (ACK/NACK) over a physical uplink control channel (PUCCH) based on a PUCCH resource indicator (PRI) of the PDCCH.

17. The UE of claim 16, wherein the PDCCH is one of a plurality of PDCCHs, from the repeated PDCCHs, having the latest start symbol, and the PDCCH:

is any of the plurality of PDCCHs;

is associated with a specific CORESET;

is associated with a specific SS; or schedules reception of the PDSCH with a latest start time.

18. The UE of claim 17, wherein the specific CORESET has a lowest index among CORESETs of the plurality of PDCCHs.

19. The UE of claim 17, wherein the specific SS has a lowest index among SSs of the plurality of PDCCHs.

20. The UE of claim 12, wherein:

the PDCCH has the latest ending symbol among the repeated PDCCHs;

in determining the resources, the controller is further configured to determine a slot for transmission of an acknowledgement (ACK)/negative ACK (NACK) over a physical uplink control channel (PUCCH) based on a slot offset indicated in the PDCCH; and the PDCCH indicates a release of a semi-persistent scheduling (SPS) PDSCH configuration, indicates secondary cell (SCell) dormancy, or requests transmission of a Type-3 HARQ-ACK codebook.

* * * * *